US00RE45466E

(19) United States
(12) Reissued Patent
Jung et al.

(10) Patent Number: US RE45,466 E
(45) Date of Reissued Patent: Apr. 14, 2015

(54) SYSTEM AND METHOD FOR TRANSMITTING RANDOM ACCESS DATA USING ORTHOGONAL FREQUENCY DIVISION MULTIPLE ACCESS

(75) Inventors: Soo-Jung Jung, Daejeon (KR); Kwang-Soon Kim, Daejeon (KR); Byung-Han Ryu, Daejeon (KR)

(73) Assignee: Electronics and Telecommunications Research Institute, Daejeon (KR)

(21) Appl. No.: 13/422,300

(22) Filed: Mar. 16, 2012

Related U.S. Patent Documents

Reissue of:

(64) Patent No.: 7,680,156
Issued: Mar. 16, 2010
Appl. No.: 10/582,636
PCT Filed: Sep. 8, 2004
PCT No.: PCT/KR2004/002279
§ 371 (c)(1),
(2), (4) Date: Jun. 12, 2006
PCT Pub. No.: WO2005/057822
PCT Pub. Date: Jun. 23, 2005

(30) Foreign Application Priority Data

Dec. 11, 2003 (KR) ..... 10-2003-0090149

(51) Int. Cl.
*H04J 3/12* (2006.01)
*H04J 11/00* (2006.01)

(52) U.S. Cl.
CPC ..... *H04J 11/0026* (2013.01)

(58) Field of Classification Search
CPC ..... H04W 74/0833; H04W 72/042; H04W 74/006; H04W 74/002; H04L 5/0007
See application file for complete search history.

(56) References Cited

U.S. PATENT DOCUMENTS

| | | | | |
|---|---|---|---|---|
| 5,790,551 | A | 8/1998 | Chan | |
| 5,909,436 | A * | 6/1999 | Engstrom et al. | 370/343 |
| 6,381,229 | B1 * | 4/2002 | Narvinger et al. | 370/328 |
| 6,819,930 | B1 * | 11/2004 | Laroia et al. | 455/450 |
| 6,967,935 | B1 * | 11/2005 | Park et al. | 370/320 |
| 7,023,826 | B2 * | 4/2006 | Sjoberg et al. | 370/338 |
| 7,248,659 | B2 * | 7/2007 | Roberts | 375/355 |
| 7,787,519 | B2 * | 8/2010 | Suwa et al. | 375/146 |

(Continued)

FOREIGN PATENT DOCUMENTS

| | | |
|---|---|---|
| DE | 19800953 C1 | 7/1999 |
| FR | 19800953 | 7/1999 |

(Continued)

OTHER PUBLICATIONS

Choi, Hyun-Ho et al., "Hybrid Access Scheme Based on One Phase Preamble and Channel Monitoring/Allocation for Satellite Internet Communication," IEEE 55th Vehicular Techology Conference, VTC Spring, vol. 2:923-927 (2002).

So, Jae-Woo et al., "Improved Channel Assignment Scheme With Access Control for the Common Packet Channel in WCDMA Systems," IEEE Communications Letters, vol. 6(5):184-186 (2002).

International Search Report for Application No. PCT/KR2004/002279, 2 pages, dated Mar. 10, 2005.

*Primary Examiner* — Jung Park
(74) *Attorney, Agent, or Firm* — Nelson Mullins Riley & Scarborough LLP

(57) ABSTRACT

Disclosed is a random access data transmission system and method using OFDMA. The system includes a scheduling ID into an access grant on a preamble for a random access, and transmits it together with an acknowledgment or a non-acknowledgment of the preamble, a base station uses the scheduling ID to notify the mobile station of a random access data transmittable time and a data transmission channel through a control channel, and the mobile station transmits a preamble in advance. After receiving a transmission assignment instruction corresponding to a scheduling ID through the control channel, the mobile station transmits random access data through an assigned channel.

25 Claims, 4 Drawing Sheets

(56) References Cited

U.S. PATENT DOCUMENTS

| | | | | |
|---|---|---|---|---|
| 2003/0046159 | A1* | 3/2003 | Ebrahimi et al. | 705/14 |
| 2003/0210674 | A1* | 11/2003 | Honkasalo et al. | 370/338 |
| 2004/0082356 | A1* | 4/2004 | Walton et al. | 455/522 |
| 2004/0109405 | A1* | 6/2004 | Suh et al. | 370/208 |
| 2004/0109433 | A1* | 6/2004 | Khan | 370/345 |
| 2004/0246998 | A1* | 12/2004 | Ma et al. | 370/527 |
| 2004/0252655 | A1* | 12/2004 | Lim et al. | 370/321 |
| 2005/0041573 | A1* | 2/2005 | Eom et al. | 370/208 |
| 2005/0105505 | A1* | 5/2005 | Fishler et al. | 370/349 |
| 2007/0123291 | A1* | 5/2007 | Moulsley et al. | 455/522 |

FOREIGN PATENT DOCUMENTS

| | | | |
|---|---|---|---|
| WO | 00/56102 | A1 | 9/2000 |
| WO | WO 00/56102 | | 9/2000 |
| WO | 02/13400 | A2 | 2/2002 |
| WO | WO 02/13400 | | 2/2002 |

* cited by examiner

SYSTEM AND METHOD FOR TRANSMITTING RANDOM ACCESS DATA USING ORTHOGONAL FREQUENCY DIVISION MULTIPLE ACCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

[This application is the National Phase application of International Application No. PCT/KR2004/002279, filed 8 Sep. 2004, which designates the United States and was published in English. This application. in its entirety , is incorporated herein by reference.] *This Reissue application of U.S. Pat. No. 7,680,156 claims the benefit under 35 U.S.C. §365 of International Application PCT/KR2004/002279, filed 8 Sep. 2004, which designated the United States and was published in English. This application, in its entirety, is incorporated herein by reference.*

TECHNICAL FIELD

The present invention relates to a system and method for transmitting random access data using OFDMA (orthogonal frequency division multiple access.) More specifically, the present invention relates to a system and method for transmitting random access data using OFDMA for allowing a plurality of mobile stations to transmit burst-characterized data through an uplink common channel for the purpose of effective usage of resources.

BACKGROUND ART

A wireless mobile communication system divides a total resource such as frequency bands or data rates into many smaller ones, schedules them according to respective users' requests, and thus shares the resource by using multiple access methods such as time division, frequency division, and code division.

The method for a plurality of mobile stations to transmit intermittent data through an uplink common channel for the purpose of effective usage of resources is a random access method for allowing all the mobile stations to have transmission rights and transmit data randomly.

One of the random access methods is to allow a mobile station to transmit a preamble to a base station in advance. The preamble is generated by using a randomly selected code from among distinguishable codes. After having received a corresponding access grant on the preamble from the base station, the mobile station transmit the actual random access data.

The above-noted method for transmitting random access data allows the preamble and the data to be transmitted through a common random access channel, and additionally requires resource assignment.

Further, one of methods for responding to the preamble transmitted from the mobile station is to use the code which is received when an access grant signal is generated, and retransmit the preamble. Another one is to use code and channel information which is captured at the time of receiving the preamble.

Since a lesser amount of resources is needed for transmitting the preamble, it is allowable to assign a lesser amount of resources irrespective of a random access request by the mobile station. However, it is inefficient to assign the transmission resource for transmission of random access data irrespective of a random access request by the mobile station.

DISCLOSURE OF INVENTION

Technical Problem

It is an advantage of the present invention to transmit ACK/NACK information including a scheduling ID when a base station responds to a preamble of a random access mobile station.

It is another advantage of the present invention to provide a system and method for transmitting random access data using OFDMA for allowing a base station to assign a specific ID to each preamble when receiving the preamble, variably assign a channel for transmitting random access data according to resource assigned conditions, and notify a mobile station of assignment of the channel resource by using ID.

Technical Solution

In one aspect of the present invention, provided is a random access data transmission system using OFDMA between a mobile station and a base station, wherein the mobile station comprises: a resource selector for randomly selecting a preamble transmission channel and a code; a preamble transmitter for generating a preamble based on the transmission resource information selected by the resource selector and transmitting the preamble to the base station through a preamble transmission channel; a preamble access grant processor for receiving and processing acknowledgment or non-acknowledgment information including a scheduling ID contained in the preamble access grant from the base station; and a data transmitter for transmitting random access data through a data transmission channel assigned to the mobile station based on the information processed by the preamble access grant processor.

In another aspect of the present invention, provided is a random access data transmission system using OFDMA (orthogonal frequency division multiple access) between a mobile station and a base station wherein the base station comprises: a preamble receiving processor for receiving a preamble from the mobile station and extracting corresponding preamble information; an ID manager for assigning a specific scheduling ID to each mobile station and managing the specific scheduling ID so that the mobile station may use a assigned data transmit channel; a scheduler for scheduling a data transmission time, and a transmission quantity of the mobile station with the scheduling ID assigned to the mobile station by the ID manager according to channel environments and requirements of the mobile stations; an access grant processor for determining an acknowledgment/non-acknowledgment status based on the preamble information of the preamble receiving processor and the scheduling ID of the ID manager, and transmitting preamble access grant configuring information including the scheduling ID to the mobile station; and a data receiving processor for receiving the random access data through a assigned data transmission channel from the mobile station according to a transmission result of the access grant processor, and processing them.

The ID manager recovers the scheduling ID assigned to the mobile station when the data receiving processor finishes receiving of transmitted random access data.

In still another aspect of the present invention, provided is a random access data transmission method using OFDMA between a mobile station and a base station, wherein the procedure of mobile station comprises: (a) selecting a preamble transmission channel and a transmission radio resource related to a code used for transmitting a preamble for a random access to the base station; (b) generating a preamble and transmitting the preamble to the base station using the transmission radio resource selected in (a); (c) receiving preamble access grant configuring information including a scheduling ID and acknowledgment/non-acknowledgment information assigned by the base station with respect to the preamble transmitted in (b), and checking a success or failure in transmission of the preamble, and the scheduling ID; and (d) allowing the mobile station to check an assignment of the data transmission channel by using the mobile station's scheduling ID included in a control channel according to a checking result in (c), and transmitting random access data to the base station through the data transmission channel assigned to the mobile station.

In step (d), the mobile station uses extracted transmission control information related to timing, a frequency, and power from the access grant information received in (c) to transmit random access data.

In still yet another aspect of the present invention, provided is a random access data transmission method using OFDMA between a mobile station and a base station, wherein the procedure of base station comprises: (a) allowing the base station to receive and analyze a preamble transmitted from the mobile station, and assigning a specific scheduling ID when the mobile station can be scheduled; (b) determining an acknowledgment or a non-acknowledgment and forming preamble access grant configuring information according to the preamble information analyzed in (a) and an assigned status of the scheduling ID, and transmitting the preamble access grant configuring information to the mobile station; (c) allowing the base station to schedule a data transmission time, a transmission channel, and a transmission quantity of each mobile station according to the mobile stations' channel environments and requirements, and notifying the mobile station of scheduled results by using scheduling ID; and (d) receiving random access data from the mobile station corresponding to the scheduling ID determined in (c) through the data transmission channel, and processing the random access data.

The step (d) comprises recovering the scheduling ID assigned to the mobile station when the reception of the random access data transmitted from the mobile station is finished.

ADVANTAGEOUS EFFECTS

Description of Drawings

The accompanying drawings, which are incorporated in and constitute a part of the specification, illustrate an embodiment of the invention, and, together with the description, serve to explain the principles of the invention.

Best Mode

In the following detailed description, only the preferred embodiment of the invention has been shown and described, simply by way of illustration of the best mode contemplated by the inventor(s) of carrying out the invention. As will be realized, the invention is capable of modification in various obvious respects all without departing from the invention. Accordingly, the drawings and description are to be regarded as illustrative in nature, and not restrictive. To clarify the present invention, parts which are not described in the specification are omitted.

A random access data transmission system using OFDMA according to the preferred embodiment of the present invention will be described in detail with reference to FIG. 1.

Figure 1:
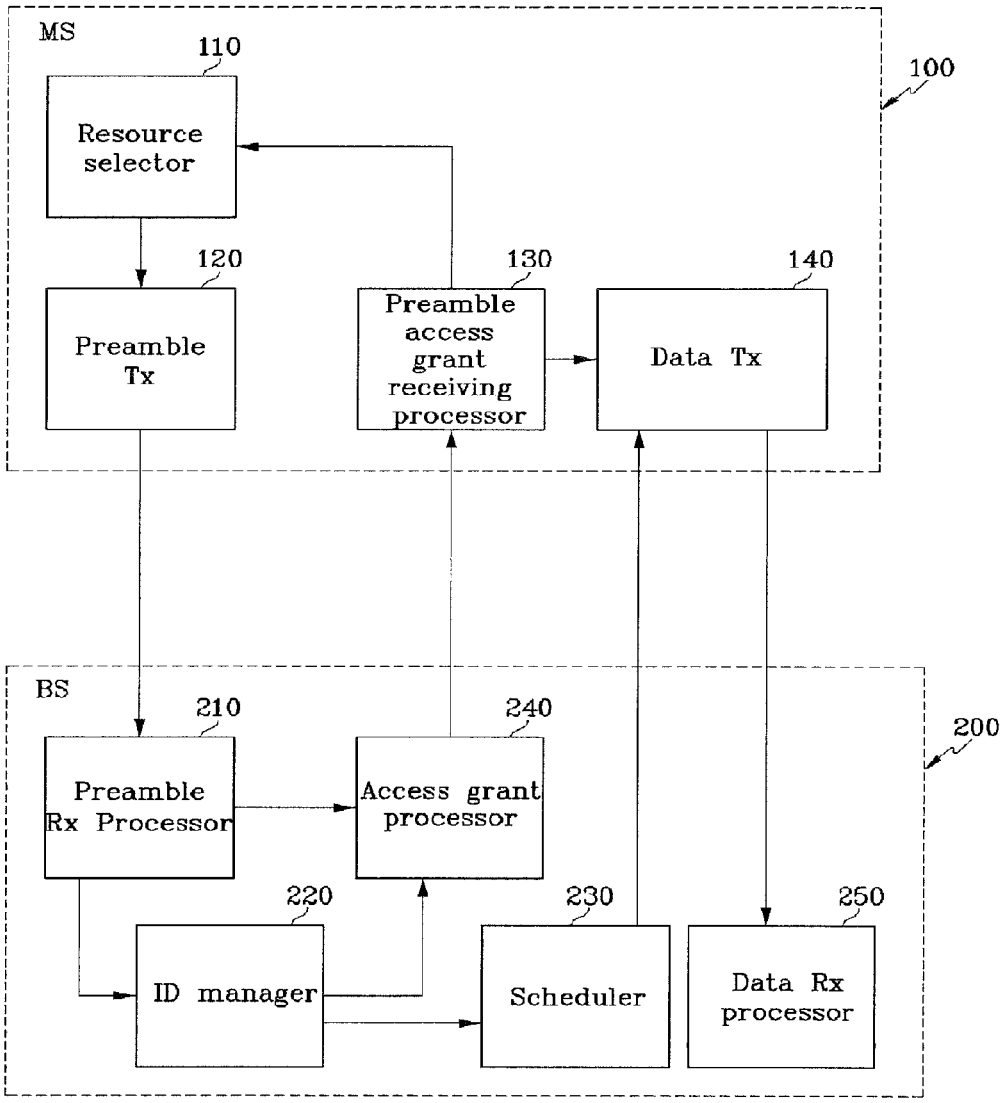
FIG. 1 shows a configuration diagram of a random access data transmission system using OFDMA according to a preferred embodiment of the present invention.
Figure 2:
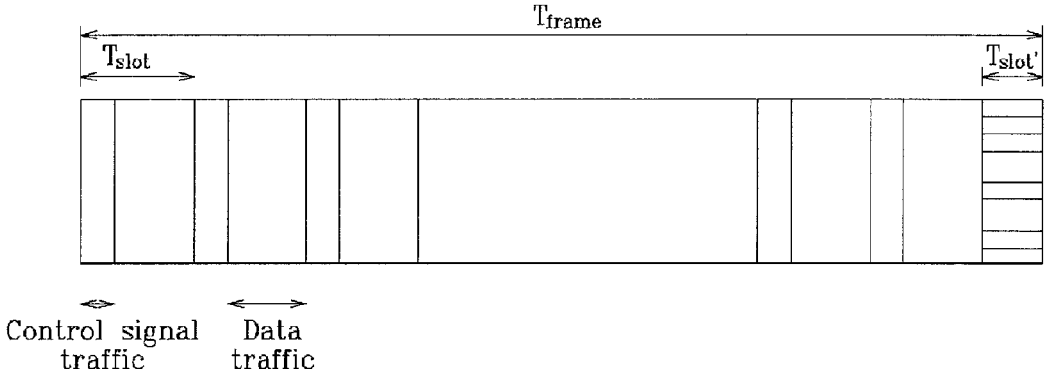
FIG. 2 shows a configuration of an uplink frame according to a preferred embodiment of the present invention.
Figure 3:
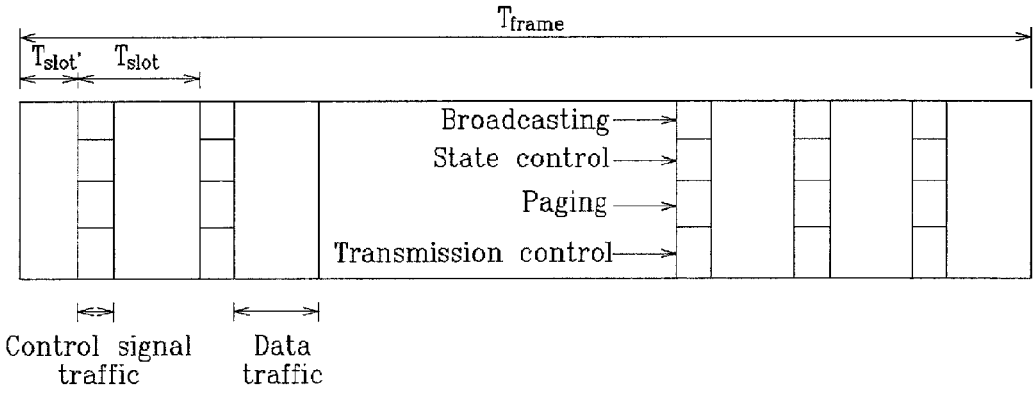
FIG. 3 shows a configuration of a downlink frame according to a preferred embodiment of the present invention.

FIG. 1 shows a configuration diagram of a random access data transmission system using OFDMA according to a preferred embodiment of the present invention, FIG. 2 shows a configuration of an uplink frame according to a preferred embodiment of the present invention, and FIG. 3 shows a configuration of a downlink frame according to a preferred embodiment of the present invention.

As shown in FIG. 1, when using the random access method including the case in which a mobile station registers to a cell for the first time, the case in which the mobile station requests a state transition, and the case in which the mobile station requests a handover from one cell to another, the random access data transmission system using OFDMA assigns a scheduling ID included in downlink access grant transmitted by the base station 200 to the uplink preamble transmitted by the mobile station 100 so that the mobile station may transmit the random access data to the base station 200 through a data transmission channel assigned to the scheduling ID.

For this purpose, the mobile station 100 comprises a resource selector 110, a preamble transmitter 120, a preamble access grant receiving processor 130, and a data transmitter.

The resource selector 110 selects transmission radio resources like codes, preamble transmission channel for transmitting the preamble for a random access to the base station codes.

The preamble transmitter 120 generates a preamble by using information on the transmission radio resource selected by the resource selector 110, and transmits the corresponding preamble to the base station through the preamble transmission channel.

In the OFDMA/FDD system which uses different frequency bands for uplinks and downlinks, the preamble transmitter 120 fixes a specific slot in an uplink frame for an available time of preamble transmission. An uplink frame is made up a plurality of slots. Radio frequency resources of the specific slot are divided into a plurality of subchannels. The preamble transmitter 120 transmits the preamble which is generated by using the code which is distinguishable from among the different codes through the subchannel randomly selected from among the subchannels.

In this instance, slots of the uplink frame except the slot which is fixed for transmitting the preamble are divided into control information transmission channels and data transmission channels, and the random access data are loaded on part of the data transmission channel and transmitted to the base station 200.

As shown in FIG. 2, the uplink frame having a predetermined length of Tframe comprises a plurality of slots where the length of the slots is Tslot, excluding the final slot having a length of Tslot'.

The possibility of each slot's transmission of the random access preamble is determined according to the position of the slot in the frame. When the preamble transmission position is defined to be the final slot within the frame, the final slot of the frame is fixed to the time for transmitting the preamble, and the radio resources of the slots are divided into subchannels and are then used.

The mobile station 100 randomly selects one of the radio resources which are divided as the subchannels at the time of transmitting the preamble, uses the code which is distinguishable by different codes, and transmits the generated preamble to the base station 200.

The slots except the final slot are divided into control information transmission channels and data transmission channels. A channel for transmitting the random access data is not classified as a separate transmission channel, and the random access data are transmitted by using part of the data transmission channels.

The preamble access grant receiving processor 130 receives a preamble access grant including a scheduling ID and ACK/NACK information on the preamble from the base station 200 according to the transmission by the preamble transmitter 120, and processes them.

The data transmitter 140 transmits the random access data to the base station 200 through the data transmission channel of the scheduling ID assigned to the mobile station 100 based on the information processed by the preamble access grant receiving processor 130.

The base station 200 comprises a preamble receiving processor 210, an ID manager 220, a scheduler 230, an access grant processor 240, and a data receiving processor 250.

The preamble receiving processor 210 receives preambles from the respective mobile stations 100, and extracts preamble information including codes, timing, and power through the preambles.

The ID manager 220 assigns a specific scheduling ID to each mobile station 100 and manages it so that the mobile station 100 may use a data transmission channel specified by the base station 200, and also recovers and manages the scheduling ID assigned to the mobile station when the data receiving processor 250 finishes receiving of transmitted random access data.

The scheduler 230 assigns the resources of the packet service, and in detail, it considers requirements including a channel environment and QoS of the mobile stations, and determines transmission times and quantities of the mobile stations to which the scheduling IDs are given according to a scheduling algorithm.

The access grant processor 240 loads preamble access grant information in a specific slot of the downlink frame including a plurality of slots, and transmits the same to the mobile station 100.

As shown in FIG. 3, the downlink frame includes a plurality of slots having a constant length Tframe, and it has the same length as that of the uplink frame.

The slots of the downlink frame comprises a slot Tslot' for synchronization and cell search, and downlink traffic slots Tslot which include a transmission time of data traffic and a transmission time of control signal traffic.

The period of physical channels for transmitting the control signal traffic can be a multiple of the frame period, which represents that the data configured by block units are partially divided and transmitted for each slot.

The data transmitted to the downlink through the channel at the transmission time of the control signal traffic include broadcasting information, paging information, state management information, and data transmission control information.

Since control signal information channels for transmitting the control signal information divide and use the orthogonal frequencies because of characteristics of the OFDMA system, a preamble access grant channel for transmitting access grants on the preamble transmission can be configured with N subchannels from among the channel.

It is required to use the restricted radio resources with an appropriate ratio and purpose, and the assignment ratio of the resources is varied according to the cell configuration in the OFDMA system.

Therefore, it is desirable for the base station to separately notify the mobile station of configuration information of a preamble access grant channel, use the configuration information of the preamble access grant channel, and allow the mobile station to check the preamble acknowledgements ACK/NACK so that the base station may effectively manage the channel for transmitting the access grant of the preamble, compared to the method for fixing part of the control signal information channel to be a preamble access grant channel in consideration of the maximum value of the random access request available in the existing cell.

The data receiving processor 250 receives and processes the random access data transmitted by the mobile station 100 which has received the access grant of the access grant processor 240.

An operation of the random access data transmission system using OFDMA according to a preferred embodiment will now be described with reference to a drawing.

Figure 4:
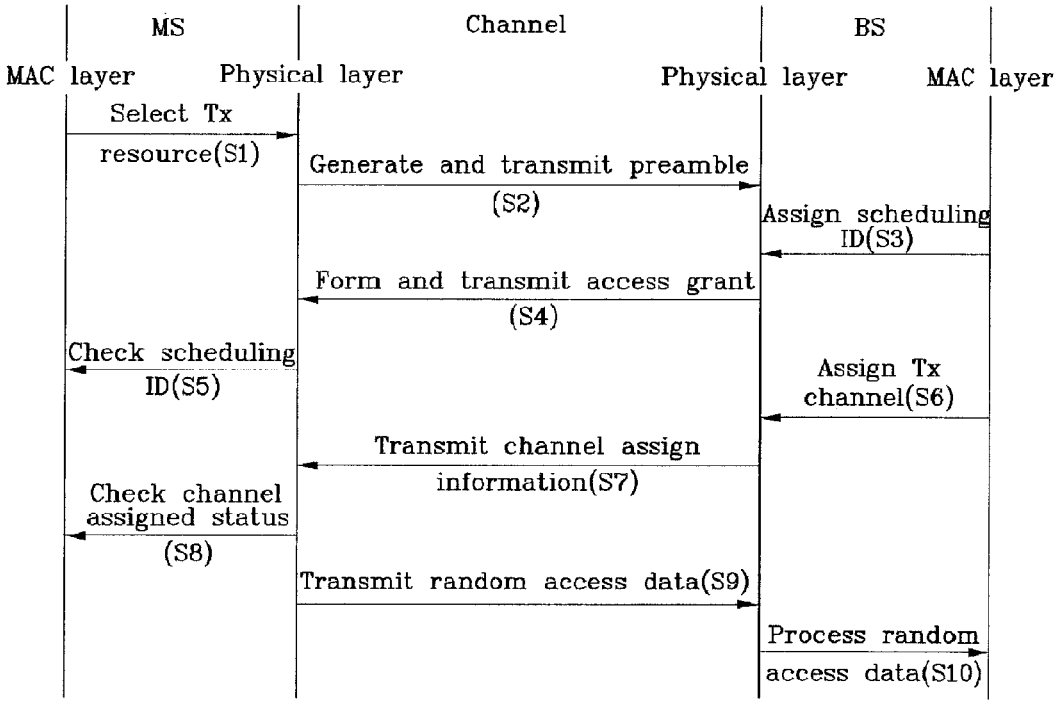
FIG. 4 shows a data transmission process of the random access data transmission method using OFDMA according to a preferred embodiment of the present invention.

FIG. 4 shows a data transmission process of the random access data transmission method using OFDMA according to the preferred embodiment of the present invention.

As shown in the random access data transmission method using OFDMA, the resource selector 110 of the mobile station 100 initially selects a transmission radio resource used for transmitting the preamble in step S1.

The preamble transmitter 120 receives information on the transmission radio resource selected by the resource selector 110, generates a preamble, and transmits it to the base station 200 through a preamble transmission channel in step S2.

The preamble receiving processor 210 of the base station 200 analyzes the preamble received through the preamble transmitter 120, extracts preamble information including codes, timing, and power, and the ID manager 220 assigns a scheduling ID to the mobile station to be scheduled in step S3.

The access grant processor 240 determines acknowledgment/non-acknowledgment status on the preamble provided from the mobile station according to the preamble information extracted from the preamble receiving processor 210 and assigned status of the scheduling ID provided by the ID manager 220.

The access grant processor 240 configures preamble access grant configuring information by using the scheduling ID information, ACK/NACK information, and preamble information extracted from the preamble, and transmits the preamble access grant configuring information which is access grant information to the mobile station 100 through the control information transmission channel specified by the base station 200 in step S4.

The preamble access grant receiving processor 130 of the mobile station 100 receives the preamble access grant configuring information from the access grant processor 240 through the preamble acknowledgement channel, and checks successful preamble transmission status and the scheduling ID in step S5.

When finishing transmission of the preamble access grant configuring information, the base station 200 transmits assignment information of the data transmission channel determined after scheduling together with the scheduling ID assigned to a random access mobile station 100 by the scheduler 230 to the mobile station 100 through the control information transmission channel in steps S6 and S7.

The random access mobile station 100 checks assigned status of the data transmission channel of the scheduling ID transmitted through the control channel in step S8, and transmits the random access data through the data transmission channel assigned to the mobile station 100 in step S9.

In this instance, the mobile station 100 minimizes the influence given to the data transmitted to the base station by another mobile station by using transmission control information including timing, a frequency, and a power received through the preamble access grant configuring information, and transmits the random access data through the data transmission channel.

When the base station 200 finishes receiving the random access data through the data receiving processor 250, the ID manager 220 recovers and manages the scheduling ID assigned to the corresponding mobile station in step S10.

As described, the base station 200 assigns data transmission channels for variably transmitting the random access data according to assigned resource status to the access grant of the preamble transmitted from the mobile station.

To achieve this, the base station 200 provides a specific scheduling ID for each preamble when transmitting an access grant on the preamble received from the mobile station to the downlink, and notifies the mobile station of assignment information on the data transmission channel determined through the scheduling ID.

It is desirable to use the scheduling ID as an identifier of the mobile station used by the scheduler 230 and use the same for the physical layer and the MAC layer.

In consideration of the channel condition and QoS of each mobile station, the scheduler 230 selects a mobile station to which the data transmission channel will be assigned, and transmits corresponding assignment information through the data transmission control channel, and hence, the mobile station checks the assignment information in the data transmission control channel through the scheduling ID assigned to the mobile station, and transmits the random access data through the data transmission channel.

In this instance, the data transmission channel is a channel for allowing the mobile station which is registered to the base station and is in the active state to transmit the data.

After receiving the random access data from the mobile station, the base station 200 transmits them to the system through a path other than that of the data of the registered mobile station. Therefore, the OFDMA-based random access data transmission system and method according to the preferred embodiment improves conventional inefficient usage of the transmission resources through assigning a separate random access data-transmission channel.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims As described in the OFDMA-based random access data transmission system and method, the base station loads the mobile station's transmission control information and the scheduling ID information into the access grant of the preamble received from the mobile station and transmits them so that the mobile station may transmit the random access data through the data transmission channel without an additional separated channel, thereby enabling effective usage of the radio resources, and transmitting the data without influencing data transmission of other mobile stations by using the transmission control information.

The invention claimed is:

1. A random access data transmission system using OFDMA (orthogonal frequency division multiple access) between a mobile station and a base station, the mobile station comprising:

a resource selector for selecting a preamble transmission channel and a code-related transmission resource for transmitting a preamble for a random access to the base station;

a preamble transmitter for using the transmission resource selected by the resource selector to generate the preamble and transmitting the preamble to the base station though the preamble transmission channel;

a preamble access grant processor for (i) receiving acknowledgment or non-acknowledgment information, which includes a scheduling ID provided by the base station for each preamble, in a preamble access grant from the base station in response to the transmission by the preamble transmitter, and (ii) processing the received information; and a data transmitter for transmitting random access data though a data transmission channel associated with the scheduling ID assigned to the mobile station based on the information processed by the preamble access grant processor;

wherein the data transmission channel over which the random access data is transmitted from the mobile station to the base station is different from the preamble transmission channel over which the preamble is transmitted from the mobile station to the base station.

2. The random access data transmission system of claim 1, wherein the preamble transmitter fixes a specific slot within an uplink frame as a preamble transmittable time, said uplink frame further comprising, besides said fixed, specific slot, a plurality of slots, randomly selects one of subchannels of a radio resource of the fixed, specific slot, uses a code which is distinguishable from other codes, and transmits the preamble generated though the selection of the subchannel and usage of the code.

3. The random access data transmission system of claim 2, wherein the slots of the uplink frame except the specific slot which is fixed with the preamble transmittable time are classified as a control information transmission channel and a data transmission channel, and random access data are loaded on part of the data transmission channel and transmitted to the base station.

4. A random access data transmission system using OFDMA (orthogonal frequency division multiple access) between a mobile station and a base station the base station comprising:

a preamble receiving processor for receiving, over a preamble transmission channel, a preamble from the mobile station and extracting corresponding preamble information;

an ID manager for assigning a specific scheduling ID to each preamble sent by the mobile station and managing the specific scheduling ID so that the mobile station may use an assigned data transmission channel associated with said scheduling ID;

a scheduler for scheduling a data transmission time, and a transmission quantity of the mobile station together with the scheduling ID assigned to the mobile station by the ID manager according to channel environments and requirements of the mobile stations;

an access grant processor for using the preamble information of the preamble receiving processor and the scheduling ID of the ID manager to determine an acknowledgment/non-acknowledgment status, and transmitting preamble access grant configuring information including the scheduling ID to the mobile station; and a data receiving processor for receiving the random access data through said assigned data transmission channel from the mobile station according to a transmission result of the access grant processor, and processing the received random access data;

wherein said assigned data transmission channel over which the random access data is transmitted from the mobile station to the base station is different from the preamble transmission channel over which the preamble is transmitted from the mobile station to the base station; and wherein the base station notifies the mobile station of said assigned data transmission channel for transmission of the random access data only after and in response to receipt of the preamble from the mobile station.

5. The random access data transmission system of claim 4, wherein the preamble information of the preamble receiving processor includes information on a code, timing, and power used for transmitting the preamble by the mobile station.

6. The random access data transmission system of claim 4, wherein the ID manager recovers the scheduling ID assigned to the mobile station when the data receiving processor finishes reception of the random access data.

7. The random access data transmission system of claim 4, wherein the access grant processor loads the preamble access grant configuring information on a specific slot of a downlink frame comprising a plurality of slots, and transmits the same to the mobile station.

8. The random access data transmission system of claim 7, wherein the specific slot is assigned for synchronization and base station search and other slots are assigned for downlink traffic slots in the downlink frame.

9. The random access data transmission system of claim 8, wherein the downlink traffic slots are classified as a data traffic transmission time and a control signal traffic transmission time so that the random access data may be divided into part of each slot and then be transmitted.

10. A random access data transmission method using OFDMA (orthogonal frequency division multiple access) between a mobile station and a base station, the method at the mobile station comprising:

(a) selecting a preamble transmission channel and a transmission radio resource related to a code used for transmitting a preamble for a random access to the base station;

(b) using the transmission radio resource selected in (a) to generate the preamble and transmitting the preamble over the preamble transmission channel to the base station;

(c) receiving preamble access grant configuring information, which includes a scheduling ID assigned by the base station for each preamble, and acknowledgment/non-acknowledgment information with respect to the preamble transmitted in (b), and checking a successful status of transmission of the preamble, and the scheduling ID; and (d) checking an assignment of a data transmission channel associated with the scheduling ID by using the mobile station's scheduling ID included in a control channel according to a checking result in (c), and transmitting random access data to the base station through the data transmission channel assigned to the mobile station;

wherein the data transmission channel over which the random access data is transmitted from the mobile station to the base station is different from the preamble transmission channel over which the preamble is transmitted from the mobile station to the base station.

11. The random access data transmission method of claim 10, wherein (d) comprises extracting transmission control information including timing, a frequency, and power though the access grant information received in (c), and transmitting random access data by using the transmission control information.

12. The random access data transmission method of claim 10, wherein (b) comprises fixing a specific slot within an uplink frame as a preamble transmittable time, said uplink frame further including, besides said fixed, specific slot, a plurality of slots, which are classified as control information and data transmission channels, wherein the random access data are loaded on part of the data transmission channel and transmitted to the base station; and transmitting the preamble generated by randomly selecting any one of the radio resources of the fixed, specific slot and using a code which is distinguishable from other codes.

13. A random access data transmission method using OFDMA (orthogonal frequency division multiple access) between a mobile station and a base station, the method at the base station comprising:

(a) receiving and analyzing a preamble transmitted over a preamble transmission channel from the mobile station, and assigning a specific scheduling ID for each preamble when the mobile station can be scheduled;

(b) determining an acknowledgment or a non-acknowledgment and forming preamble access grant configuring information according to the preamble information analyzed in (a) and an assigned status of the scheduling ID, and transmitting the preamble access grant configuring information to the mobile station;

(c) scheduling a data transmission time, a data transmission channel, and a transmission quantity of each mobile station together with the scheduling ID assigned to each mobile station according to the mobile station's channel environments and requirements, and notifying the mobile station of scheduled results; and (d) receiving random access data from the mobile station corresponding to the scheduling ID though the data transmission channel determined in (c), and processing the random access data;

wherein the data transmission channel over which the random access data is transmitted from the mobile station to the base station is different from the preamble transmission channel over which the preamble is transmitted from the mobile station to the base station; and wherein the base station notifies the mobile station of the data transmission channel for transmission of the random access data only after and in response to receipt of the preamble from the mobile station.

14. The random access data transmission method of claim 13, wherein (d) comprises recovering the scheduling ID assigned to the mobile station when the reception of the random access data from the mobile station is finished.

15. The random access data transmission method of claim 13, wherein (b) comprises distributing the preamble access grant configuring information to part of a specific slot of a downlink frame comprising a plurality of slots, and transmitting it to the mobile station.

*16. A random access method in a wireless communication system, the method at a mobile station comprising:*

*transmitting a preamble, without a random access message, through preamble transmission channel to a base station;*

*receiving a preamble response message that conveys a scheduling ID and an assignment information of radio resource of data transmission channel for random access data transmission; and*

*transmitting random access data to the base station through the radio resource of data transmission channel assigned to the mobile station,*

*wherein the scheduling ID is specific for the mobile station and identification for random access procedure,*

*wherein the preamble is generated by using a code that is distinguishable from other codes,*

*wherein the random access data is transmitted after the preamble is transmitted and the preamble response message is received in response to the preamble, and*

*wherein the scheduling ID is used for a physical layer and a Medium Access Control (MAC) layer of the mobile station.*

*17. The method of claim 16, wherein the assignment information of radio resource is associated with the scheduling ID.*

*18. The method of claim 16, wherein the preamble response message conveys timing and power information for transmitting random access data.*

*19. The method of claim 16, wherein data transmission channel over which random access data is transmitted is different from preamble transmission channel over which the preamble is transmitted.*

*20. The method of claim 16, wherein a configuration for receiving the preamble response message is determined in consideration of the maximum value of random access requests available in the base station, and the preamble response message is received from the base station with reference to the configuration.*

*21. A random access method in a wireless communication system, the method at a base station comprising:*

*receiving a preamble, without a random access message, through preamble transmission channel from a mobile station;*

*transmitting a preamble response message that conveys a scheduling ID and an assignment information of radio resource of data transmission channel for random access data transmission; and*

*receiving random access data from the mobile station through the radio resource of data transmission channel assigned to the mobile station,*

*wherein the scheduling ID is specific for the mobile station and identification for random access procedure,*

*wherein the preamble is generated by using a code that is distinguishable from other codes,*

*wherein the random access data is transmitted after the preamble is transmitted and the preamble response message is received in response to the preamble, and*

*wherein the scheduling ID is used for a physical layer and a Medium Access Control (MAC) layer of the mobile station.*

*22. The method of claim 21, wherein the assignment information of radio resource is associated with the scheduling ID.*

*23. The method of claim 21, wherein the preamble response message conveys timing and power information for receiving random access data.*

*24. The method of claim 21, wherein data transmission channel over which random access data is received is different from preamble transmission channel over which the preamble is received.*

*25. The method of claim 21, wherein a configuration for transmitting the preamble response message is determined in consideration of the maximum value of random access requests available in the base station, and the preamble response message is transmitted to the mobile station with reference to the configuration.*

* * * * *